United States Patent [19]

McClintock

[11] Patent Number: 6,065,511

[45] Date of Patent: May 23, 2000

[54] VEHICLE FUELING SYSTEM

[76] Inventor: Gene McClintock, 126 Park Pl., Laredo, Tex. 78045

[21] Appl. No.: 09/151,704

[22] Filed: Sep. 11, 1998

[51] Int. Cl.[7] .................................................. B65B 1/04
[52] U.S. Cl. .............................. 141/231; 141/94; 141/98; 141/232
[58] Field of Search .................................. 141/1, 94, 98, 141/231, 232; 137/234.6, 236.1; 340/825

[56] References Cited

U.S. PATENT DOCUMENTS

| | | | |
|---|---|---|---|
| 2,948,306 | 8/1960 | Kuraeff | 141/232 |
| 3,814,148 | 6/1974 | Wostl | 141/232 |
| 4,981,272 | 1/1991 | Cutore . | |
| 5,080,077 | 1/1992 | Sawert et al. . | |
| 5,107,906 | 4/1992 | Swenson et al. . | |
| 5,211,021 | 5/1993 | Pierson . | |
| 5,305,805 | 4/1994 | Watkins, Jr. . | |
| 5,305,926 | 4/1994 | Webb . | |
| 5,315,831 | 5/1994 | Goode et al. . | |
| 5,325,894 | 7/1994 | Kooy et al. . | |

*Primary Examiner*—David J. Walczak
*Assistant Examiner*—Timothy L. Maust
*Attorney, Agent, or Firm*—Richard C. Litman

[57] ABSTRACT

A vehicle fueling system which uses a tank vehicle similar to or the same as those used for jets to rapidly and efficiently refuel trucks and other land motor vehicles. The truck driver parks his truck in a designated vehicle fueling station, gives the station attendant the station identifier, and arranges for payment. The station attendant then radios a tank vehicle operator. The tank vehicle operator takes a tank vehicle to the corresponding station and refuels the truck. The amount of time required to refuel the truck is dramatically reduced from one hour to approximately ten minutes. The driver has the option of returning to the road immediately or enjoying the amenities of a driver respite area. The driver can eat, sleep, or shower. The driver may also have his vehicle washed or repaired. When the driver is ready to leave, he is given a metered record detailing the amount of fuel delivered.

9 Claims, 3 Drawing Sheets

VEHICLE FUELING SYSTEM

BACKGROUND OF THE INVENTION

1. Field of the Invention

The present invention relates generally to vehicle fueling systems. More specifically, the invention relates to a vehicle fueling system where truck drivers can shower, eat, exercise, or sleep while their trucks are fueled, washed, and/or repaired by skilled truck care workers.

2. Description of Prior Art

Modern day trucking is a growing field. Coupled with deregulation and a decrease in shipping costs, the use of trucks in interstate commerce has reached an all time high. Furthermore, more and more people are buying products that are shipped by trucks. Trucking is a competitive business. Customers generally want the fastest and cheapest delivery of their goods. Any reduction in costs or in delivery times can be a significant competitive advantage for a trucking company.

Finding enough drivers to meet this increased demand for shipped merchandise is a serious problem for trucking companies. Turnover among drivers is high. Drivers typically receive relatively high salaries and attractive employment benefits. In some instances signing bonuses are offered. Unfortunately, many drivers find these attractions insufficient to compensate for the low quality of life. Among the problems encountered are very long hours, dirty work, and poor facilities at truck stops.

A frequent result is that after driving for a year or two a driver will leave the trucking business. The trucking company then faces the considerable expense of locating a suitable replacement and training him. These expenses reduce the amount trucking companies can afford to pay their drivers, setting up a vicious circle.

A significant contributor to the long hours worked by truck drivers is time spent refueling. Drivers are not compensated for this time. The refueling process therefore greatly cuts into the amount of money the truck driver can earn. At conventional truck stops, the drivers drive their rigs up to the fuel islands and fuel their trucks themselves. The average time required to fuel a truck is approximately one hour. If a truck stop is busy, it can take up to three hours to fuel the truck. The driver is required to stay with his truck during this entire time.

The typical refueling process results in both reduced income and reduced quality of life for a driver. The time lost in refueling can slow down deliveries. This tends to reduce the income of trucking companies, which affects the income of drivers. Long refueling times are tiring and frustrating for the driver. The driver is being paid nothing for his time and yet is not able to relax or eat. Another problem is that drivers often get dirty in the process of refueling. A driver must then either put up with being dirty or take additional time to get cleaned up. These problems contribute to driver turnover and higher costs for trucking companies.

All truck drivers and trucking companies would appreciate and find tremendous value in a new truck or vehicle fueling system that greatly reduces the amount of time required to refuel a truck and eliminates the need for the driver to stay with his rig.

Truck stops are known which provide underground fuel storage tanks, pumping systems, and fuel islands for refueling trucks. Truck stops also frequently include other facilities of various sorts for use by truck drivers.

Vehicle fueling systems have been described in the patent literature. For example, U.S. Pat. No. 5,080,077 issued to Sawert et al. on Jan. 14, 1992, and U.S. Pat. No. 5,211,021 issued to Pierson on May 18, 1993 both describe fuel delivery systems but fail to disclose a portable land vehicle refueling system using refueling means similar to those for jets, above-ground fuel storage tanks and the amenities of a quality restaurant or motel.

U.S. Pat. No. 5,325,894 issued to Kooy et al. on Jul. 5, 1994, U.S. Pat. No. 5,315,831 issued to Goode et al. on May 31, 1994, and U.S. Pat. No. 5,107,906 issued to Swenson et al. on Apr. 28, 1992 all describe land vehicle refueling systems but fail to describe a portable land vehicle refueling system wherein the driver leaves his vehicle and enjoys dinner, exercising or sleep while expert or skilled vehicle care providers refuel the vehicle, wash the vehicle, and/or repair the vehicle while providing the driver with a record detailing the amount and cost of fuel delivered.

U.S. Pat. No. 5,305,926 issued to Webb on Apr. 26, 1994, U.S. Pat. No. 4,981,272 issued to Cutore on Jan. 1, 1991, and U.S. Pat. No. 5,305,805 issued to Watkins, Jr. on Apr. 26, 1994 all describe portable vehicle refueling systems and are incorporated by reference. They fail to disclose a vehicle refueling system wherein the driver leaves his vehicle and enjoys dinner, exercising or sleep while expert or skilled vehicle care providers refuel the vehicle, wash the vehicle, and/or repair the vehicle while providing the driver with a record detailing the amount and cost of fuel delivered.

None of the above inventions and patents, taken either singularly or in combination, is seen to describe the instant invention as claimed. Thus a vehicle fueling system solving the aforementioned problems is desired.

SUMMARY OF THE INVENTION

The present invention relates to a truck or vehicle fueling system that reduces the amount of time needed to refuel the truck from one hour to approximately ten minutes. Unlike conventional truck stops, the driver is not required to stay with his truck and refuel the truck himself. This saves as much as three hours at busy truck stops. With the vehicle fueling system of the present invention, the truck driver parks in a vehicle fueling station. This is a parking stall having a station identifier, such as a stall number. The driver gives the station attendant the station identifier and verification for payment. The station attendant then radios a tank vehicle. A tank vehicle operator takes the tank vehicle to the corresponding vehicle fueling station and fuels the truck in less than five minutes using a jet fueling apparatus.

The driver has the option of waiting for the tank vehicle operator to fuel his truck. The driver can also take advantage of the amenities offered at the quality restaurant, motel, and exercise center. When the driver is ready to continue his journey, he will be presented with a metered record showing the amount of fuel delivered.

The vehicle fueling system would allow the driver to eat, sleep, exercise or simply relax by watching television, while truck care workers care for his truck. The skilled truck care workers would refuel the truck, wash the windshields, perform other preventive maintenance duties, and subsequently present the driver with a metered record showing the amount of fuel delivered. The tank vehicle would be similar to or the same as vehicles used to refuel jets. The tank vehicle would rapidly and efficiently refuel trucks. The refueling time would be reduced from one hour to approximately ten minutes. The time saving directly corresponds to an increase in monies earned for drivers who want to immediately return to the road.

Accordingly, it is a principal object of the invention to provide a vehicle fueling system wherein the time required to refuel a truck is substantially reduced by implementing a method of refueling eliminating in ground pumping stations for truck rigs.

It is another object of the invention to provide a vehicle fueling system using a tank vehicle similar to that used for jets, to rapidly and efficiently refuel trucks and other land vehicles.

Another object of the invention is to provide a vehicle fueling system which fills the fuel tanks of an average truck within a fill time no greater than 10 minutes.

It is a further object of the invention to provide a vehicle fueling system wherein skilled truck care workers will refuel a truck while the driver partakes of the amenities of a quality restaurant, motel, and/or fitness or recreational center.

Still another object of the invention is to provide a vehicle fueling system in which the skilled truck care workers will also wash the truck and perform needed truck repairs.

Another object of the invention is to improve service and reduce delivery times for goods transported by truck by reducing time spent refueling.

Another object of the invention is to provide a vehicle fueling system which will improve the quality of life for truck drivers, increase money earned by drivers, reduce turnover of drivers, and reduce hiring and training costs for trucking companies.

It is an object of the invention to provide improved elements and arrangements thereof in a vehicle fueling system for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention relates to a vehicle fueling system wherein a truck care specialist uses a tank vehicle to refuel a truck, similar to or the same as the vehicles used to refuel jets. The time required is a fraction of the time required for refueling at conventional truck stops. While the truck is being refueled, the driver has the option of waiting a short period of time, or of taking advantage of the facilities provided. The time for refueling would be reduced from the average of one hour at conventional truck stops, to approximately ten minutes. Facilities for enjoyment of the driver are also provided, such as a quality restaurant, motel, and/or fitness center. In addition, the driver has the option of having the truck care workers wash his truck or perform truck maintenance or repair. A full service truck repair facility is provided. When the driver is ready to continue driving, a metered record showing the amount of fuel delivered is delivered to the driver.

Figure 1:
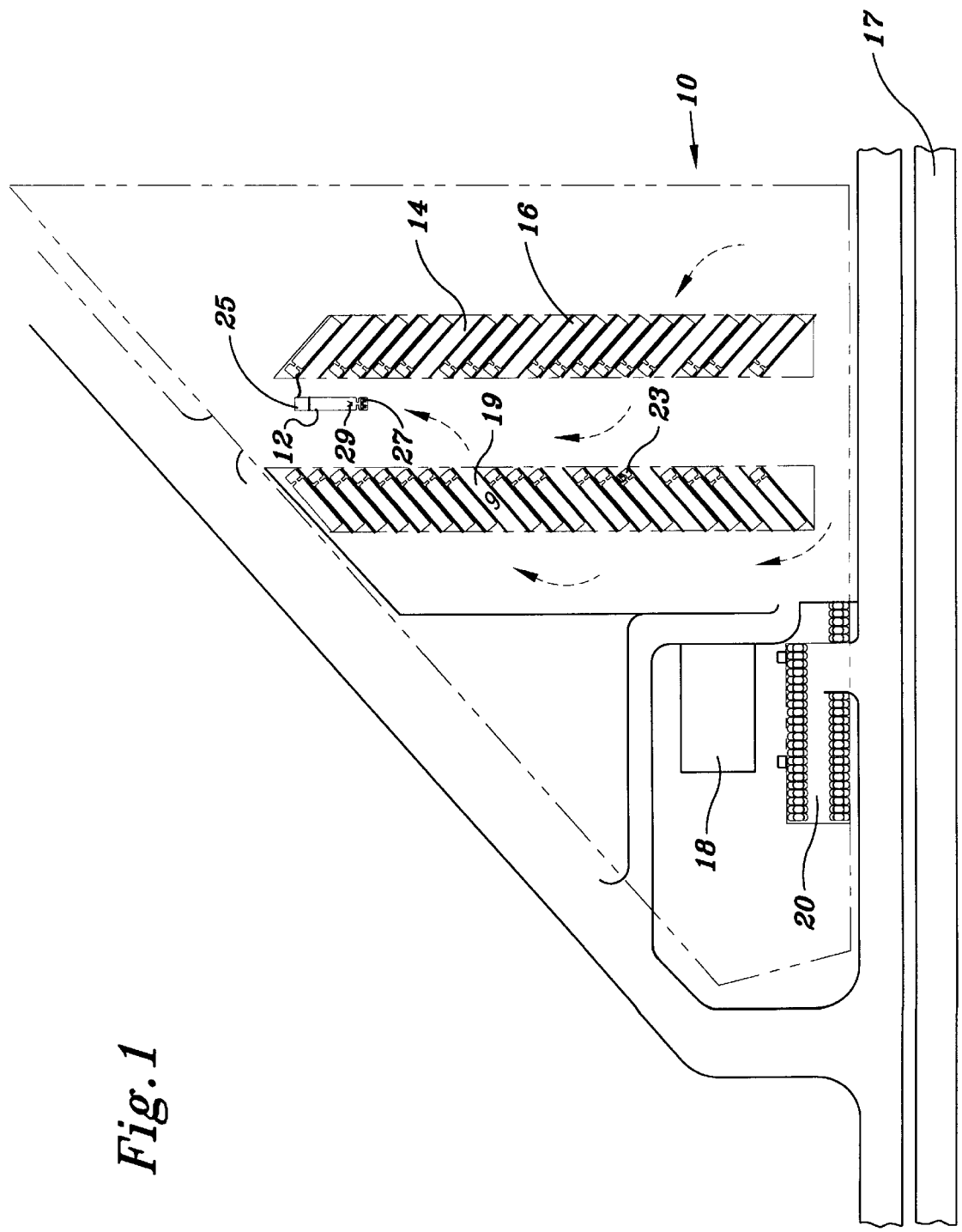
FIG. 1 is a top plan view of the vehicle fueling system showing the vehicle fueling stations and the driver respite area according to the present invention.

FIG. 1 is a top plan view of the vehicle fueling system 10, with the elements of the present invention diagrammatically shown. The vehicle fueling system 10 includes a plurality of motor vehicle fueling stations 14 and at least one tank vehicle 12. The vehicle fueling stations 14 do not include conventional pumps, fuel islands or similar facilities. Each vehicle fueling station 14 is adapted to accommodate a plurality of motor vehicles 16. The motor vehicles 16 are adapted to travel on land. Each motor vehicle 16 is operated by a driver 23. The motor vehicles 16 might include trucks, automobiles, and locomotives. The vehicle fueling system 10 is particularly suited to vehicles having a large fuel capacity.

Preferably the motor vehicles 16 are trucks. Most preferably the trucks have a motorized cab and at least one trailer unit, for a total of three or more axles. At least one of the axles has four or more tires. Preferably the vehicle fueling stations 14 are sized to accommodate a parked truck. Only one motor vehicle 16 would be accommodated at a time by each vehicle fueling station 14. A driver 23 needing fuel for his motor vehicle 16 would pull off the vehicle transportation route 17 and park in an available empty vehicle fueling station 14. A succession of motor vehicles 16 would occupy each vehicle fueling station 14, be refueled, and then move on, each leaving space for the next motor vehicle 16.

Each vehicle fueling station 14 would have a station identifier 19 so that it could be uniquely identified by the driver 23 to the station attendant 21. The station identifier 19 would also serve to uniquely identify each vehicle fueling station 14 to the tank vehicle operator or operators 27. The station identifier 19 might be a number, as shown. The station identifier 19 might also be a letter or a combination of letters and numbers. Preferably the station identifier 19 would be easy for a driver 23 of a motor vehicle 16 to remember. The station identifier 19 would then be more likely to be accurately reported to the station attendant 21. The station identifier 19 would be prominently displayed at each vehicle fueling station 14 to assure against mistakes. For example, the station identifier 19 might be painted at each end of the parking stall of the vehicle fueling station 14.

The station identifier 19 might include redundancy to minimize the chance of a mix-up in station identifiers 19. For example, twenty-six vehicle fueling stations 14 might have station identifiers 19 ranging from A-1 to Z-26. If the number and letter of the station identifier 19 provided by a driver 23 did not match, the station attendant 21 would know that the driver 23 had made an error as to the station identifier 19.

The vehicle fueling station 14 might also include an automatic ticket machine. On parking his motor vehicle 16, a driver 23 would press a button and receive a ticket giving the station identifier 19 of the vehicle fueling station 14 in which his motor vehicle was parked. The driver 23 could simply present the ticket to the station attendant 21, without having to remember any numbers. Alternatively, rather than checking in face-to-face with a station attendant 21, the driver 23 could enter payment information directly into an automatic ticket machine or terminal at the vehicle fueling station 14. This might be done using a credit card reading system or similar system. The ticket machine would automatically inform the station attendant 21 that a motor vehicle 16 corresponding to a station identifier 19 was ready for refueling.

The driver 23 might turn any necessary keys over to the station attendant 21. Keys might also simply be left in the motor vehicle 16, provided the vehicle fueling station 14 was reasonably secure.

Refueled vehicles 16 would preferably not remain in the vehicle fueling stations 14 for long periods of time. The motor vehicles 16 would either return immediately to the vehicle transportation route 17 or park in the vehicle parking facility 22. However, the vehicle fueling stations 14 might serve as the vehicle parking facility 22, provided enough vehicle fueling stations 14 were available. All of the parking spaces would require station identifiers 19 and would have to be accessible to the tank vehicle 12.

The tank vehicle 12 is adapted to storing and transporting fuel for motor vehicles 16. The tank vehicle 12 transports fuel to each of the vehicle fueling stations 14. Preferably there are two tank vehicles. The vehicle fueling station 14 might or might not have special equipment to assist the tank vehicle 12 in refueling, such as a stand or a lifting apparatus for a hose. The tank vehicle 12 has a refueling means for rapidly and efficiently delivering a volume of fuel to a motor vehicle 16 accommodated in the vehicle fueling station 14 having a particular station identifier 19.

The refueling means operates independently without the driver 23 of the motor vehicle 16 being present to supervise. The station attendant 21 would notify a tank vehicle operator 27 of the proper station identifier 19 of the motor vehicle 16 to be refuelled. For example, the station attendant 21 might radio to the tank vehicle operator 27. The tank vehicle 12 might include an antenna 29 for receiving signals from the station attendant 21. Alternatively, the station attendant 21 might also be a tank vehicle operator 27. The tank vehicle operator 27 might then be automatically notified by radio when a driver 23 entered payment information into a terminal at a vehicle fueling station 14.

The refueling means of the tank vehicle 12 may include one or more high-speed pumps 25. The pump 25 would provide a rate of flow sufficient to deliver a volume of fuel corresponding to the fuel capacity of a motor vehicle 16 within a fill time. The fill time is preferably as short as possible. For trucks, the fill time is preferably no more than 10 or 15 minutes, and is most preferably less than 5 minutes. Suitable pumps include the Hale MDL. 4D6-CBP and the Gorman Rupp MDL. 66C3GD pumps. The tank vehicle operator 27 or other truck care worker might also wash the windshield while the vehicle is being refueled.

Preferably the refueling means is modified from a refueling means for delivering jet fuel to jets. At most, relatively minor modifications would be required for storing and delivering diesel fuel to trucks.

Preferably the tank vehicle 12 is a jet refueler or refueling tanker for jets. Information on an appropriate jet refueler is available in the manual *Refuelers—Service and Maintenance*, by American Airlines, which is hereby incorporated by reference. The flow system is preferably the Parker Hannifin Company design, with a primary pressure regulating valve and a secondary bypass valve. Jet refuelers have extensive safety systems. This equipment can meet all the fire safety and other safety regulations in all states. The safety equipment includes a filter/separator, sensors, and back-up sensors. No water or dirt can be pumped from the jet refueler into the fuel tank of a truck. The filter/separator removes pieces of dirt as small as 2 microns. Water is collected and separated from the fuel. Sensors on the unit assure that the jet refueler cannot be overfilled. The jet refueler fills from the bottom. If the fuel pipe is damaged in any way, a 4-inch valve on the inside of the tank closes. The valve closes in only 3/10 second, so that it is impossible to spill fuel. The sensors cannot be overridden manually. Other fueling vehicles do not have such extensive safety equipment. The jet refueler is safer than any other type of fueling system.

With two tank vehicles 12, up to 100,000 gallons per day would be pumped. The volume delivered to a particular motor vehicle 16 is recorded so that the driver 23 can be charged the proper amount.

Tank vehicle 12 greatly reduces the time required to refuel a motor vehicle 16, such as a truck. Typically the time is reduced from one hour to approximately ten minutes. Since the refuelling time is reduced, the driver 23 has the option of returning to his rig and immediately continuing on his journey. This may be especially attractive if the driver has a deadline to meet or wishes to earn extra money. If the driver 23 is tired or hungry, he may also choose to spend time at driver respite area 18.

The use of a tank vehicle 12 eliminates the need for a conventional fuel island and conventional pumps. This in turn eliminates the requirement of underground fuel storage tanks. This represents a substantial savings for both construction and operation. Underground fuel tanks are expensive to build. Such tanks are also subject to extensive environmental regulation. By their nature underground fuel tanks are prone to leak into the ground and contaminate soil and groundwater. Since an underground fuel tank is generally largely invisible, leaks can continue undetected for long periods. Since the vehicle fueling system 10 requires no underground fuel storage tanks, the occurrence of environmental fuel leakage is substantially eliminated. Consequently, there is no need for Environmental Protection Agency (E.P.A.) permits or fire permits. This represents a significant cost savings.

Figure 2:
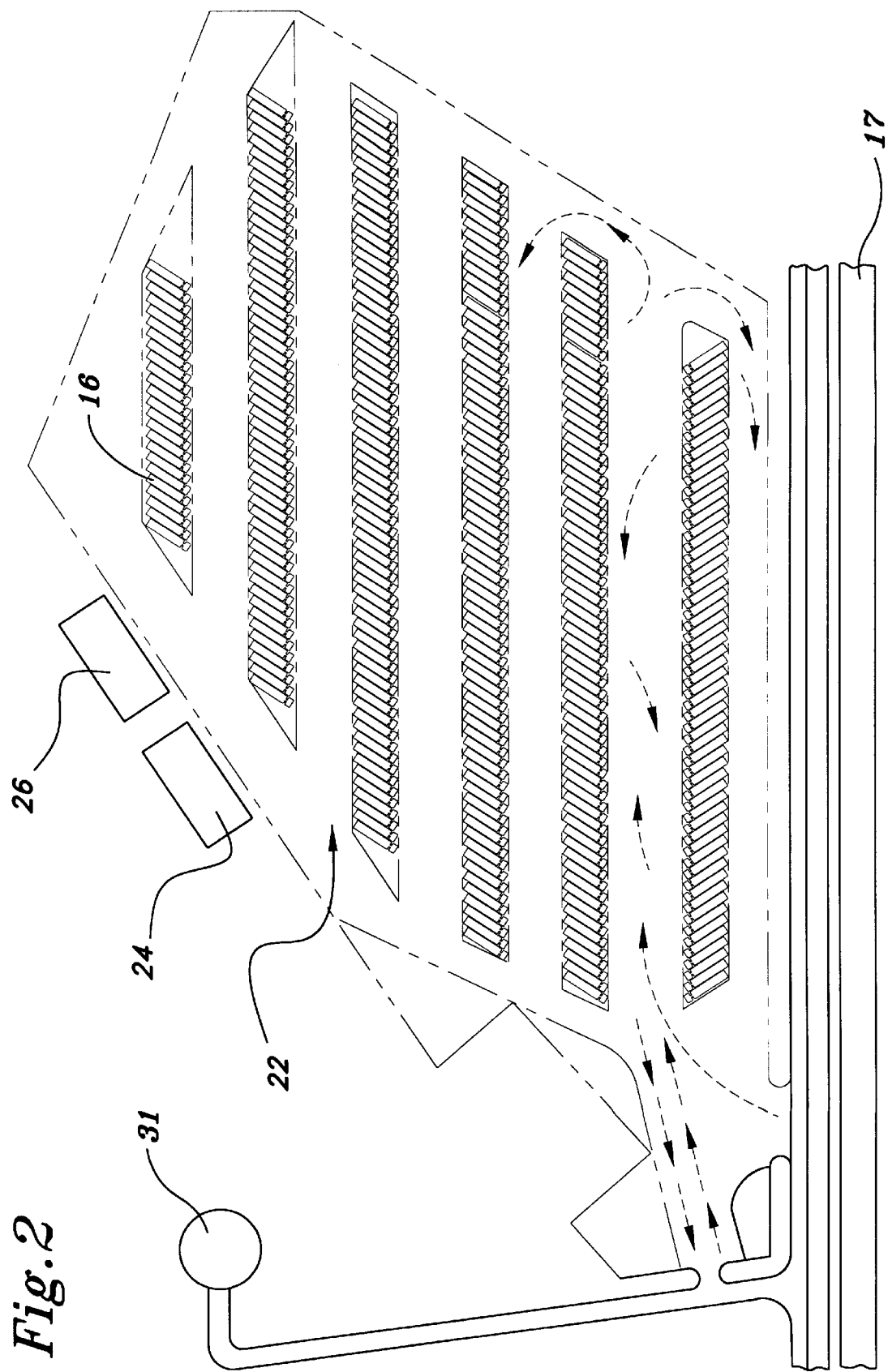
FIG. 2 is a fragmentary, top plan view of a portion of the vehicle fueling system showing the vehicle parking facility, vehicle washing facility, and vehicle repair facility.

The fuel capacity of the tank vehicle 12 preferably is relatively large compared to the fuel capacity of each motor vehicle 16. Preferably, fuel is delivered and pumped directly into the tank vehicles 12. Tank vehicles 12 might also obtain fuel at a nearby commercial fuel company. Otherwise, fuel might be stored in an above-ground fuel storage tank 31. A fuel storage tank 31 is diagrammatically shown in FIG. 2. A fuel storage tank 31 might be desirable if the vehicle fueling stations 14 were arranged so that a large-capacity tank vehicle 12 would have difficulty in maneuvering among them. A small-capacity tank vehicle in combination with a fuel storage tank 31 might require less fuel for its own operation.

If present, the fuel storage tank 31 is located largely above ground level. The fuel storage tank 31 stores fuel for transfer to the tank vehicle 12. The tank vehicle 12 would be refilled as needed from the above-ground fuel storage tank 31. The above-ground fuel storage tank 31 is located within a relatively short distance from the vehicle fueling stations 14. For example, the fuel storage tank 31 might be located within 10 miles. This prevents the tank vehicle 12 from wasting time and fuel driving back and forth to the fuel storage tank 31.

The vehicle fueling system 10 preferably includes a driver respite area 18. The driver respite area 18 is located within walking distance of the vehicle fueling stations 14. Preferably the driver respite area 18 is less than 200 yards from the furthest vehicle fueling station 14, most preferably less than 100 yards. Preferably the driver respite area is located within a single building. While a driver's truck is being refueled, he can amuse and refresh himself with the amenities offered at driver respite area 18.

Figure 3:
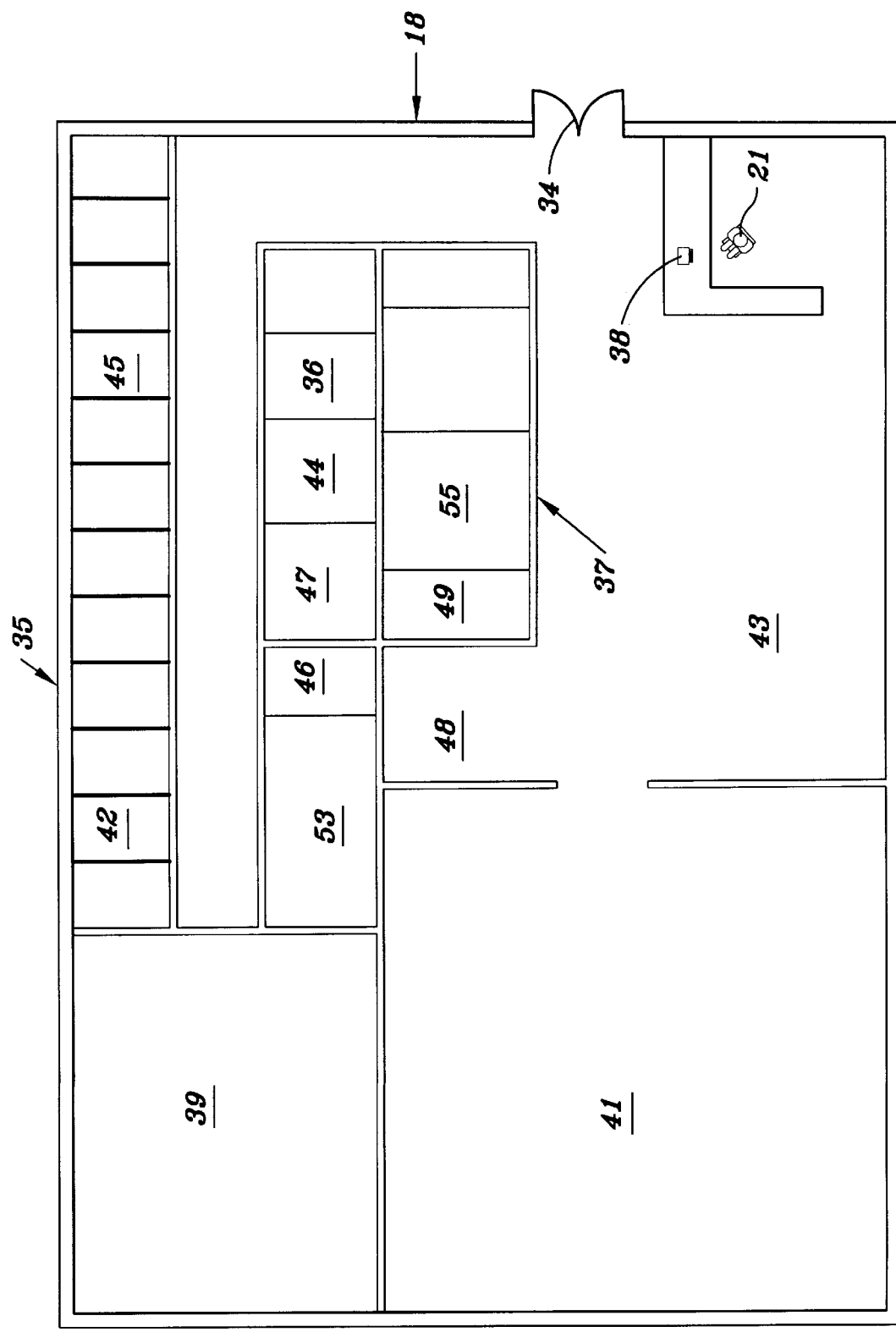
FIG. 3 is a detail view of the driver respite area of FIG. 1.

FIG. 3 is a detail view of the driver respite area 18 of FIG. 1, with the elements of the driver respite area diagrammatically shown. For clarity, some details have been largely omitted from FIG. 3, such as door openings and fixtures. The driver respite area 18 may be a single building or a motel, as shown in FIG. 3. A door 34 leads to the vehicle fueling stations 14. Preferably the driver respite area 18 includes a food facility 33, a rest facility 35, and a recreation facility 37.

The food facility 33 may include a quality restaurant with a kitchen area 39 and a dining room 41. The food facility 33 might also include vending machines and/or a merchandise area 43. The merchandise area 43 might sell baked goods, packaged food, drinks, and sundries.

The station attendant 21 might also act as a cashier for the merchandise area 43. The vehicle fueling system 10 includes an accounting means for providing to each driver 23 of a motor vehicle 16 a record of the volume of fuel delivered to his motor vehicle. The accounting means might include a computer 38 with an attached printer for printing out the record. The accounting means is similar to that used presently for gas stations, except that the volume delivered is recorded by a mobile tank vehicle instead of a stationary pumping system. For example, the tank vehicle operator 27 might report by radio the volume of fuel delivered to a particular motor vehicle 16. The accounting means would calculate the cost to be charged the driver.

The rest facility 35 preferably includes shower areas 42 and sleeping areas 45. The rest facility 35 preferably has a plurality of private rooms. A private room might include simply a shower area 42, with a restroom 36 communally shared. As in a motel, a shower area 42 and sleeping area 45 might be combined in a single private room. Each private room might be equipped with a shower, a jacuzzi tub, a toilet, a bed, a telephone, and other conveniences. Other facilities such as a laundry room 44, barber shop 46, shoe shine 48, massage room 49, and telephone booths 51 may be provided.

The recreation facility 37 may include an exercise area 47, a theater 53, and a television viewing area 55. The vehicle fueling system 10 gives the truck driver an opportunity to rest his body and mind in a pleasant and enjoyable atmosphere.

Although the vehicle fueling system 10 is functionally designed with a truck driver in mind, it is not limited to just truck drivers. Everyday travelers can also take advantage of the facilities located within driver respite area 18. Passenger vehicle parking lot 20 located adjacent to driver respite area 18 allows the everyday traveler convenient access to driver respite area 18. A preexisting motel or hotel may be used for driver respite area 18, provided sufficient space is available for vehicle fueling stations 14. If so, construction of the vehicle fueling facility 10 would be relatively simple and inexpensive.

The vehicle fueling system 10 may include at least one vehicle parking facility 22. The vehicle parking facility 22 is located within walking distance of the driver respite area, preferably within 500 yards. A vehicle parking facility having spaces for about 300 trucks may be provided to accommodate drivers 23 using the vehicle fueling stations 14, the driver respite area 18, and other facilities. Drivers 23 may wish to use the restaurant, shower areas 42, etc., even though they do not need fuel.

The vehicle fueling system 10 may include a vehicle washing facility 24 adapted to washing motor vehicles 16 and a vehicle repair facility 26 adapted to repairing motor vehicles 16. The vehicle washing facility 24 and vehicle repair facility 26 are preferably located within walking distance of the vehicle fueling stations 14. Preferably the distance is less than 500 yards. Preferably the vehicle washing facility 24 and vehicle repair facility 26 are adapted to washing, repairing, and maintaining trucks.

The vehicle washing facility 24 and vehicle repair facility 26 preferably operate independently without the driver 23 of the motor vehicle 16 being present. A driver 23 may make arrangements when checking in his motor vehicle 16 for the vehicle to be washed, maintained, and/or repaired by skilled truck care workers. For example, once a truck is refueled, a truck care worker might drive the truck to the vehicle parking facility 22. The truck care worker might wash the truck at the vehicle washing facility 24 or provide routine maintenance or repair at the vehicle repair facility 26. When finished, the truck care worker might park the truck, note a corresponding parking space number, and deliver the keys along with the parking space number to the truck driver. The driver 23 would not have to interrupt a meal in the restaurant to move his truck.

The present invention also includes a method of delivering fuel to motor vehicles 16. The method comprises a first step of parking a motor vehicle 16 in a vehicle fueling station 14. The motor vehicle is operated by a driver 23. The motor vehicle 16 is adapted to travel on land. The vehicle fueling station 14 is one of a plurality of vehicle fueling stations located near a vehicle transportation route 17. Each vehicle fueling station 14 is adapted to accommodate a plurality of motor vehicles. Only one motor vehicle is accommodated at a time by each vehicle fueling station 14. Each vehicle fueling station has a unique station identifier 19.

The second step is the notifying of a station attendant 21 by the driver 23 of the motor vehicle 16 of the station identifier 19 of the vehicle fueling station 14 in which the motor vehicle 16 is parked. The station attendant 21 is preferably located in the driver respite area 18. The next step is the driver 23 and the station attendant 21 arranging for payment for fuel to be delivered to the motor vehicle 16. After this step, the driver 23 is free to enjoy the amenities of the driver respite area 18, which are conveniently available.

The fourth step is the notifying of a tank vehicle operator 27 by the station attendant 21 of the station identifier 19 of the vehicle fueling station 14 in which the motor vehicle 16 is parked. Preferably the tank vehicle operator 27 is notified by radio from the building housing the driver respite area 18.

Once notified, the tank vehicle operator takes a tank vehicle 12 to the vehicle fueling station 14. The next step is the delivery of a volume of fuel to the motor vehicle 16 by the tank vehicle 12. The tank vehicle 12 is operated by the tank vehicle operator 27. The tank vehicle 12 is adapted to storing and transporting fuel for motor vehicles 16.

The final step is providing to the driver 23 of the motor vehicle 16 a record of the volume of fuel delivered.

The vehicle fueling system 10 makes refueling a truck a rather pleasant experience for the truck driver. The vehicle fueling system 10 is exceptionally faster than conventional truck stops. In addition, it alleviates the necessity of the truck driver staying with his truck, refueling it, and getting dirty in the process. With the vehicle fueling system, the driver can take a hot shower, sleep, exercise, or eat while his vehicle is cared for. Truck care workers can fuel his truck, wash the windshields and perform minor maintenance or truck repair, all without requiring the presence of the driver.

Since less time is spent on refueling, the vehicle fueling system improves service and reduces delivery times for goods transported by truck. The vehicle fueling system improves the quality of life for truck drivers. A tired truck driver can head directly for a meal and a hot shower, instead of spending time refueling. The long hours typically worked by drivers are reduced. The money earned by drivers is increased, since the driver can quickly return to the road if he wishes. Turnover among truck drivers is reduced by the improved quality of life, reduced hours and increased money earned. Since trained truck drivers are more likely to keep on driving under these conditions, hiring and training costs for trucking companies are reduced.

It is to be understood that the present invention is not limited to the embodiment described above, but encompasses any and all embodiments within the scope of the following claims.

I claim:

1. A vehicle fueling system comprising:
   (a) a plurality of motor vehicle fueling stations, each vehicle fueling station being adapted to accommodate a plurality of motor vehicles, one motor vehicle being accommodated at a time by each vehicle fueling station, each vehicle fueling station having a station identifier, each motor vehicle being adapted to travel on land, each motor vehicle being operated by a driver, each motor vehicle having a fuel capacity;
   (b) at least one tank vehicle, the tank vehicle being adapted to storing and transporting fuel for motor vehicles, the tank vehicle transporting fuel to each of the vehicle fueling stations, the tank vehicle having a refueling means for rapidly and efficiently delivering a volume of fuel to the motor vehicle accommodated in the vehicle fueling station having a particular station identifier, the refueling means operating independently without the driver of the motor vehicle being present;
   (c) an accounting means for providing to the driver of the motor vehicle a record of the volume of fuel delivered to the motor vehicle;
   (d) a driver respite area, the driver respite area being located within walking distance of the vehicle fueling stations; and
   (e) a vehicle washing facility adapted to washing motor vehicles and a vehicle repair facility adapted to repairing motor vehicles, said vehicle washing facility and vehicle repair facility being located within walking distance of the vehicle fueling stations, said vehicle washing facility and vehicle repair facility operating independently without the driver of the motor vehicle being present.

2. The vehicle fueling system according to claim 1, further comprising at least one vehicle parking facility, said vehicle parking facility being located within walking distance of the driver respite area.

3. The vehicle fueling system according to claim 1, further comprising at least one fuel storage tank, the fuel storage tank being located largely above ground level, the fuel storage tank storing fuel for transfer to the tank vehicle, the fuel storage tank being located within a relatively short distance from the vehicle fueling stations.

4. The vehicle fueling system according to claim 1, wherein the refueling means is a refueling means for delivering jet fuel to jets.

5. The vehicle fueling system according to claim 1, wherein the driver respite area includes a motel.

6. The vehicle fueling system according to claim 1, wherein
   (a) said refueling means includes at least one pump, the pump providing a rate of flow sufficient to deliver a volume of fuel corresponding to the fuel capacity of the motor vehicle within a fill time; and
   (b) the motor vehicles accommodated in the vehicle fueling stations are selected from the group consisting of trucks, automobiles, and locomotives.

7. The vehicle fueling system according to claim 6, wherein
   (a) the motor vehicles accommodated in the vehicle fueling stations are trucks; and
   (b) the fill time is no greater than 10 minutes.

8. The vehicle fueling system according to claim 1, wherein the driver respite area includes a food facility, a rest facility, and a recreation facility.

9. The vehicle fueling system according to claim 8, wherein the food facility includes a restaurant, the rest facility includes a shower area, and the recreation facility includes an exercise area and a television viewing area.

* * * * *